(12) United States Patent
Bleicher et al.

(10) Patent No.: US 9,346,139 B2
(45) Date of Patent: May 24, 2016

(54) VIBRATING DEVICE WITH WORKPIECE RECEIVING PORTION AND COMPENSATING MASS

(75) Inventors: Friedrich Bleicher, Vienna (AT); Johannes Bernreiter, Strasshof (AT)

(73) Assignee: TECHNISCHE UNIVERSITÄT WIEN, Vienna (AT)

( * ) Notice: Subject to any disclaimer, the term of this patent is extended or adjusted under 35 U.S.C. 154(b) by 368 days.

(21) Appl. No.: 14/118,440

(22) PCT Filed: May 18, 2012

(86) PCT No.: PCT/AT2012/000137
§ 371 (c)(1),
(2), (4) Date: Nov. 18, 2013

(87) PCT Pub. No.: WO2012/167288
PCT Pub. Date: Dec. 13, 2012

(65) Prior Publication Data
US 2014/0093322 A1  Apr. 3, 2014

(30) Foreign Application Priority Data
May 18, 2011 (AT) .................... A 706/2011

(51) Int. Cl.
*B23Q 1/34* (2006.01)
*B30B 15/30* (2006.01)
(Continued)

(52) U.S. Cl.
CPC .. *B23Q 1/34* (2013.01); *B23Q 1/64* (2013.01); *B23Q 3/04* (2013.01); *B23Q 3/10* (2013.01);
(Continued)

(58) Field of Classification Search
CPC .......... B24B 1/04; B24B 41/007; B23Q 1/34;
B23Q 3/04; B23B 2260/108; Y10T 409/303752; Y10T 409/303808; Y10T 409/304312; Y10T 409/30868; Y10T 409/307448
USPC .................................................. 451/392, 393
IPC ........................................................ B23Q 1/34
See application file for complete search history.

(56) References Cited

U.S. PATENT DOCUMENTS

| | | | | |
|---|---|---|---|---|
| 5,165,205 A | * | 11/1992 | Nakagawa | ............... B23Q 1/34 366/108 |
| 6,241,435 B1 | * | 6/2001 | Huang | .................. B23Q 5/225 318/575 |

(Continued)

FOREIGN PATENT DOCUMENTS

| | | |
|---|---|---|
| CN | 101104244 A | 1/2008 |
| DE | 4113667 | 11/1992 |

(Continued)

OTHER PUBLICATIONS

Hu et al., "Modeling of material removal rate in rotary ultrasonic machining: designed experiments", *Journal of Materials Processing Technology*, 129:339-344, 2002.

(Continued)

*Primary Examiner* — Daniel Howell
(74) *Attorney, Agent, or Firm* — Norton Rose Fulbright US LLP (57) ABSTRACT

The invention relates to a device (1) and a method, comprising a workpiece-receiving portion (2) for receiving a workpiece (28) to be mechanically machined. At least one vibrating device (9) is connected to the workpiece-receiving portion (2), and the vibrating device (9) causes the workpiece-receiving portion (2) to vibrate, the vibration of the workpiece-receiving portion (2) having a frequency that is lower than the frequency of ultrasound. The vibrating device (9) has a vibrating body (8) to which a compensating mass (7) that vibrates in the opposite direction is associated.

20 Claims, 8 Drawing Sheets

(51) Int. Cl.
*B24B 41/00* (2006.01)
*B23Q 1/64* (2006.01)
*B23Q 3/04* (2006.01)
*B23Q 3/10* (2006.01)

(52) U.S. Cl.
CPC ............. *B24B 41/007* (2013.01); *B30B 15/304* (2013.01); *Y10T 409/30868* (2015.01); *Y10T 409/30896* (2015.01); *Y10T 409/303752* (2015.01); *Y10T 409/303976* (2015.01); *Y10T 409/304312* (2015.01)

(56) References Cited

U.S. PATENT DOCUMENTS

| | | | | |
|---|---|---|---|---|
| 7,160,175 | B2 * | 1/2007 | Kamiya | B24B 49/10 451/11 |
| 7,421,922 | B2 * | 9/2008 | Hamann | B23Q 5/40 74/424.5 |
| 7,508,116 | B2 * | 3/2009 | Liu | B23B 29/125 310/317 |
| 7,802,355 | B2 | 9/2010 | Spangenberg et al. | 29/527.5 |
| 8,157,252 | B2 * | 4/2012 | Ladra | G05B 19/404 269/56 |
| 8,360,697 | B2 * | 1/2013 | Hamann | B23Q 11/0035 408/1 R |
| 9,061,388 | B2 * | 6/2015 | Tiefenbock | B23P 25/00 |
| 2004/0008331 | A1 | 1/2004 | Cox et al. | 355/53 |

FOREIGN PATENT DOCUMENTS

| | | |
|---|---|---|
| DE | 102005057175 | 5/2007 |
| DE | 102006049867 | 4/2008 |
| EP | 0 323 518 A1 | 7/1989 |
| WO | WO 2008/118479 | 10/2008 |

OTHER PUBLICATIONS

International Preliminary Report on Patentability issued in PCT Appl. No. PCT/AT2012/000137, mailed Nov. 28, 2013.

Official Communication issued in Austrian Appl. No. A 706/2011, dated Mar. 20, 2012.

International Search Report issued in PCT Appl. No. PCT/AT2012/000137, mailed Oct. 15, 2012.

Tawakoli et al., "Entwicklung eines neuartigen 'Ultraschallsystems' zur Reali-sierung flexibler ultraschallun-terstütster Zerspanung" ("Development of a new 'ultrasound system' for the realization of flexible ultrasonic-assisted machining"), *Wissenschaft & Forschung*, pp. 28-33, 2010.

* cited by examiner

VIBRATING DEVICE WITH WORKPIECE RECEIVING PORTION AND COMPENSATING MASS

CROSS-REFERENCE TO RELATED APPLICATIONS

This application is a national phase application under 35 U.S.C. §371 of International Application No. PCT/AT2012/000137 filed 18 May 2012, which claims priority to Austrian Application No. A 706/2011 filed 18 May 2011. The entire contents of each of the above-referenced disclosures is specifically incorporated herein by reference without disclaimer.

The invention relates to a device with a workpiece-receiving portion for receiving a workpiece to be mechanically machined, wherein at least one vibrating device is connected to the workpiece-receiving portion, and the vibrating device causes the workpiece-receiving portion to vibrate, wherein the vibration of the workpiece-receiving portion has a frequency that is lower than the frequency of ultrasound, as well as a method for mechanically machining a workpiece, wherein the workpiece is caused to vibrate and the frequency of the vibration of the workpiece is lower than the frequency of ultrasound.

Various devices and methods for hybrid machining and/or ultrasound-assisted machining are known from the prior art. These usually comprise causing a tool to vibrate in the range of ultrasound, wherein the natural frequency of the tool is preferably used as the frequency for the vibrations in order to initiate desired resonance vibrations for obtaining a supporting effect, especially for chip-removing machining of a workpiece.

A tool excited in the ultrasound range is known, for example, from the publication "Modeling of material removal rate in rotary ultrasonic machining: designed experiments" by P. Hu, J. M. Zhang, Z. J. Pei and Clyde Treadwell, published in Journal of Materials Processing Technology 129, 2002, 339-344. Furthermore, various ways for causing vibration in workpieces by exciting workpieces via resonators in the ultrasound range are known from the publication "Entwicklung eines neuartigen Ultraschallsystems zur Realisierung flexibler ultraschallunterstützter Zerspanung" (Development of a novel ultrasound system for implementing flexible ultrasound-assisted chipping) by T. Tawakoli, B. Azarhoushang and N. Jandaghi, published in the journal "Wissenschaft & Forschung" (Science & research) 2010, 28-33.

Moreover, vibrating tables of a different type for casting asphalt or the like are already known from the prior art, for example from U.S. Pat. No. 7,802,355 B2.

A frame including a plate that comprises a workpiece-receiving portion is shown in EP 0 323 518 A1, the plate being connected to the frame by piezo elements. Horizontal, vertical or rotating vibrations may be caused in the plate and thus the workpiece by separately actuating the piezo elements. The frequency provided for the generated vibrations is no more than 1500 Hz.

The object of the present invention is to provide a method and a device for the mechanical machining of workpieces which is capable of performing various mechanical machining processes on a workpiece by means and/or with the aid of a vibrating movement of the workpiece itself. In contrast to known vibrating devices, in which causing resonance vibration is often desirable, resonance vibration is to be avoided in the device according to the invention since it could lead to damage on the device, so avoiding it allows to choose the frequency freely without risking damage.

According to the invention the object is achieved by the vibrating device having a vibrating body to which a compensating mass vibrating in the opposite direction is associated. By means of the compensating mass vibrating in the opposite direction of the vibrating body of the vibrating device, a decoupling of momentum can be achieved, so that any desired frequency may be used for machining the workpiece, irrespective of the natural frequency of the workpiece-receiving portion and/or the entire device.

The device according to the invention, in which the workpiece-receiving portion is caused to vibrate by means of a vibrating device having a lower frequency than the frequency of ultrasound, may be used for a variety of purposes.

First, a workpiece received in the workpiece-receiving portion may be subjected to helical or trochoid machining by actuating the vibrating device accordingly.

Furthermore, the device may also be used for hybrid machining, i.e. the vibration-assisted mechanical machining of workpieces held within the workpiece-receiving portion. Mechanical machining in the context of the present invention is intended to refer, in particular, to any chip-removing machining (e.g. "chipping") by a geometrically defined or geometrically non-defined blade; this includes mainly turning, drilling, milling and rubbing as well as grinding, honing, lapping and polishing.

If the frequency is selected sufficiently low, the device may, of course, be used for positioning the workpiece arranged within the workpiece-receiving portion with the aid of the vibrating device.

In particular, the device may be used—similar to known devices, wherein the tool is excited in the ultrasound range, however—for supporting the mechanical machining of materials difficult to machine, i.e. mainly hard and/or brittle materials such as ceramic, glass, various silicon materials such as silicon nitride or silicon oxide, but also hardened steel or the like. For the various applications, it has been found favourable for the frequency of the vibration of the workpiece-receiving portion to be below 10 kHz, preferably below 5 kHz, in particular below 1 kHz, especially preferably between 500 Hz and 50 Hz.

For compensating the forces of inertia of the vibrating body, the compensating mass may be identical to the mass of the vibrating body; in this case the compensating mass is vibrated at the same frequency and the same acceleration as the vibrating body, but in an opposite direction of movement. If the vibrating body and the compensating mass do not have equal mass, an effect of compensating inertia may be obtained by adjusting the acceleration. If the compensating mass has a lower mass than the vibrating body, a vibration of the compensating mass at the same frequency as and with a higher amplitude than the vibrating body is advantageous for momentum compensation. According to this, the compensating mass vibrates at the same frequency as the vibrating body, but is subject to higher acceleration and thus covers a longer distance while having the same frequency.

Due to the constructional circumstances it has been found particularly advantageous for the ratio between the amplitudes of the vibrations of the compensating mass and the vibrating body to be between [1]:[5] and [5]:[1], substantially [1]:[1].

In order to obtain vibrations of the workpiece-receiving portion in the desired frequency range in a simple and reliable manner, it is advantageous for the vibrating device to have at least one piezo element.

In order to obtain any desired type of vibration of the vibrating body in a plane in a simple manner, for example a rotating, diagonal etc. shape of the vibrating movement, it is advantageous for moving the vibrating body in a plane to provide at least two piezo elements having directions of movement that are preferably arranged vertically to one another. Regarding a constructionally simple design of the device, in which the desired amplitudes may be obtained by means of the piezo elements, it is favourable to associate to the vibrating body at least two piezo elements for every movement of the vibrating body in a certain direction. Here, the piezo elements may be supported in a simple manner on the outside on a housing surrounding the vibrating device on the one hand, and on a supporting protrusion of the vibrating body, which is preferably arranged substantially centrally, on the other hand.

In order to obtain the desired decoupling of the inertia momentum with regard to a simple regulation, it is advantageous for substantially the same type and number of piezo elements to engage the compensating mass and the vibrating body.

In order to obtain the desired momentum decoupling of the vibrating device, it is advantageous to provide a control and/ or regulating device for controlling and/or regulating opposite movements of the piezo elements associated to the vibrating body and the piezo elements associated to the compensating mass. Here, it is advantageous for distance and/or acceleration sensors to be associated with the vibrating body and the compensating mass, with the values measured being supplied to the control and/or regulating device as actual values.

In order to keep friction losses during the vibrating movement of the vibrating body and the compensating mass as low as possible, it is favourable for the vibrating body and/or the compensating mass to be supported on at least one air bearing.

In order to receive torques introduced into the workpiece and/or the workpiece-receiving portion in a purposeful way, it is favourable to provide a plate-shaped workpiece-receiving portion that is supported on a cover plate of a base body, preferably by an air bearing. In this way, the plate-shaped workpiece-receiving portion, also called the machine table, is supported directly on an adjacent cover plate, so there is no point of leverage for possible tilting forces affecting the workpiece-receiving portion.

In order to further reduce the moment resulting from the forces of movement, it is favourable to firmly connect the plate-shaped workpiece-receiving portion to a counter plate, with the compensating mass being arranged between the plate-shaped workpiece-receiving portion and the counter plate.

Regarding its use in the mechanical machining of workpieces, it is advantageous to arrange the device on a positioning device for aligning the workpiece-receiving portion in various orientations. Here, it is particularly favourable for up to five axes of the positioning device to be adjustable, since this allows any desired orientation of the workpiece-receiving portion in any conceivable direction.

If at least one vibrating direction of the vibrating device deviates from a direction of movement of a chip-removing tool, preferably a milling tool, it is possible to move the device in only one plane, for example, while at the same time the deviating direction of vibration with respect to the movement of the tool results in a spatial change with respect to the tool.

Tests have shown that it is particularly advantageous to provide a tool provided for chip-removing machining, preferably a milling tool, that is cooled by a cooling liquid. Here it has been found that, due to the vibration of the workpiece received in or on the workpiece-receiving portion, the flushing behaviour of the cooling liquid including the chips is improved considerably, so the material already removed from the workpiece is discharged considerably more effectively. Tests have been performed mainly in conjunction with plate-shaped ceramic materials.

The method of the initially mentioned type is characterised in that the momentum introduced for creating the vibrations is decoupled actively in order to avoid resonance vibration of the workpiece and the machine tool, wherein the frequency of the vibration of the workpiece is preferably below 10 kHz, preferably below 5 kHz, in particular below 1 kHz, especially preferably between 500 Hz and 50 Hz. The advantageous effects achieved in connection with the method according to the invention have already been discussed in conjunction with the corresponding device so reference will be made thereto in order to avoid repetitions.

If the compensating mass has a lower mass than the vibrating body, the compensating mass advantageously vibrates at the same frequency as and with a higher amplitude than the vibrating body for momentum decoupling. In this case, the momentum decoupling is advantageously regulated in an active way, as has already been described in conjunction with the device according to the invention.

Below, the invention will be explained in more detail by means of preferred exemplary embodiments illustrated in the drawings, however without being limited to them. In the individual figures of the drawings:

FIG. 9 shows a schematic detail view according to detail XIII of FIG. 8a.

Figure 1:
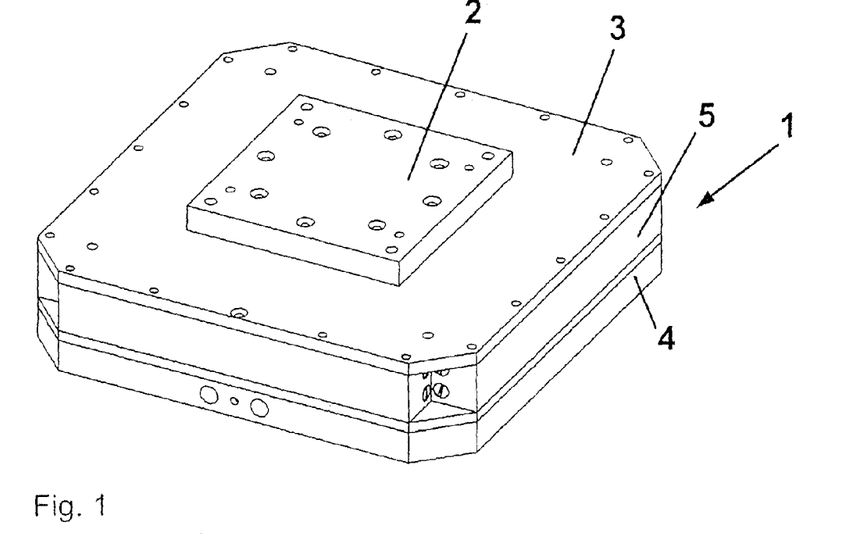
FIG. 1 shows a perspective view of the device having a workpiece-receiving portion.

A device 1 having a workpiece-receiving portion 2 is shown schematically in FIG. 1, where it can be seen that the device 1 has an upper cover plate 3 and a lower cover plate 4 between which a circumferential housing 5 is accommodated.

Figure 2:
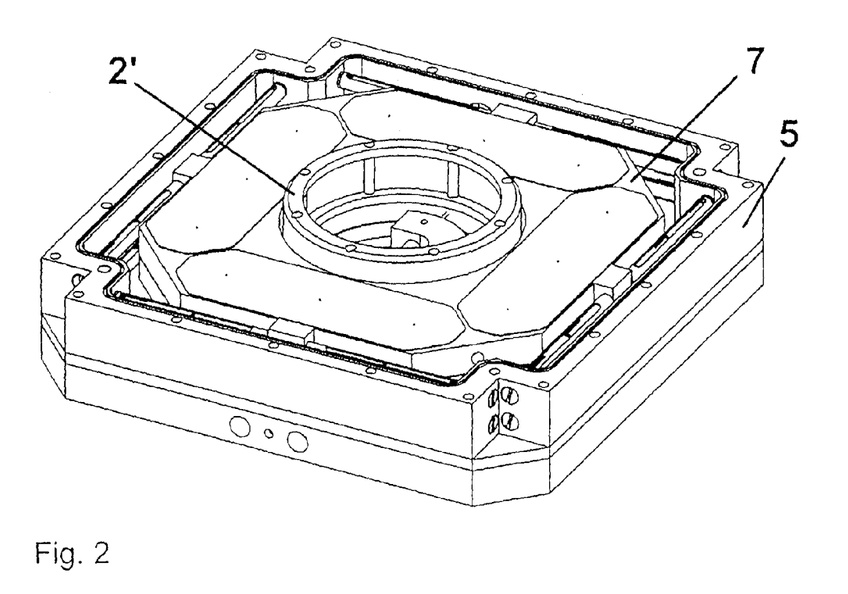
FIG. 2 shows a perspective view of the device according to FIG. 1 with the workpiece-receiving portion removed and a cover plate removed.

A compensating mass 7 is received between the upper and the lower cover plates 3, 4 and within the housing 5, as can be seen in FIG. 2. The compensating mass 7 is provided to actively decouple inertia momenta introduced by a vibrating body 8 (cf. FIG. 4) in order to avoid, in particular, resonance vibrations in a machine tool (cf. milling tool 27 in FIGS. 8a to 8d) having a tool 27' for machining a workpiece 28 (cf. FIGS. 8a to 8d) fixed on the device 1.

Both the vibrating body 8 and the compensating mass 7 are parts of a vibrating device 9 accommodated within the housing 5, provided for causing the workpiece-receiving portion 2 to vibrate. To do so, the workpiece-receiving portion 2 shown in FIG. 1 is firmly connected to the vibrating body 8 by means of a preferably cylindrical connecting element 2' that can be seen in FIG. 4.

Figure 3:
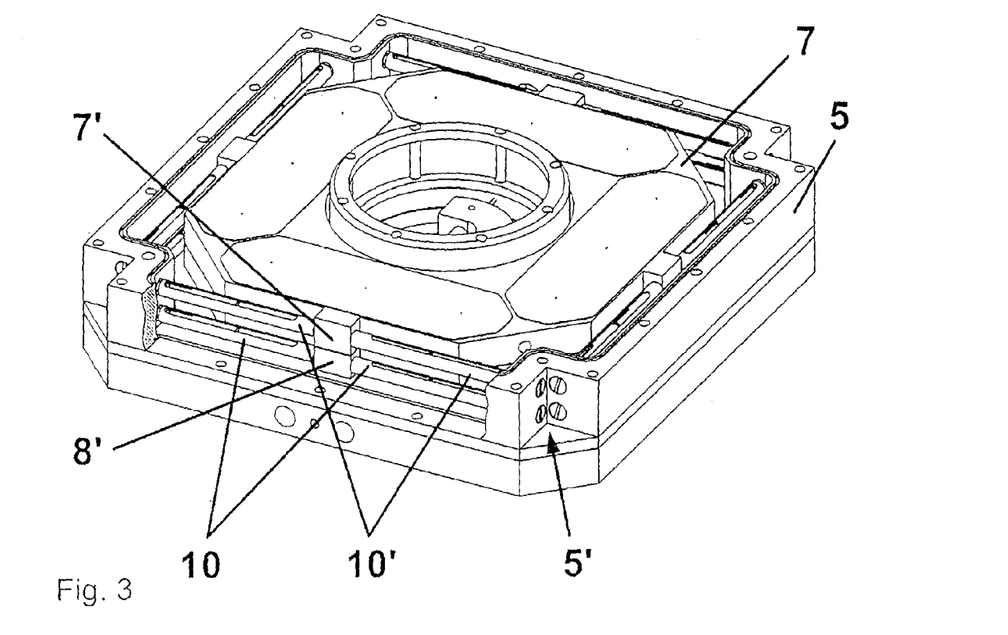
FIG. 3 shows a perspective view according to FIG. 2 with a partially opened side wall of a housing.

As actuators, the vibrating device 9 comprises rod-shaped piezo elements 10, 10' that can best be seen in FIG. 3. Two rod-shaped piezo elements 10, 10' are provided on either side of the preferably substantially square-shaped housing 5.

At this point, the piezo elements 10 cause the vibrating body 8 (including the workpiece-receiving portion 2) to vibrate as desired while the piezo elements 10' arranged above them cause the compensating mass 7 to vibrate. On the one hand, the piezo elements 10, 10' each are supported by the housing 5, which has recesses 5' for this purpose in the region of the corners, and on the other hand, they are supported by substantially centrally arranged supporting protrusions 8' and 7' of the vibrating body 8 and the compensating mass 7, respectively.

The two piezo elements 10 and/or 10' arranged on a longitudinal side are interconnected in such a way that they are actuated by a control and/or regulating device 11 (cf. FIG. 5) in opposite directions. For this purpose, two piezo stacks are combined in each of the rod-shaped piezo elements 10, 10' being arranged between the housing 5 and the supporting protrusion 7' or 8'; such piezo stacks are commercially available and used for actuating injection nozzles in the automotive industry, for example. Such piezo elements 10, 10' composed of two piezo stacks allow causing vibrations having an amplitude of up to +/−60 μm, preferably +/−20 μm. On each opposite side, two piezo elements 10, 10' are provided as well, being actuated in the same way as the piezo elements 10, 10' arranged on the opposite side of the vibrating body 8 and/or the compensating mass 7. However, the piezo elements 10, 10', which are substantially arranged perpendicularly thereto, are actuated independently, so that the vibrating body 8 and/or the compensating mass 7 may perform any desired movement, for example a diagonal or circular movement.

For the forming of air bearings 12, a clearance 11' is provided in a supporting plate 11 of the vibrating body, accommodating a planar slide bearing element 12', preferably made of a carbon material. The cross-section of the compensating mass 7 is designed substantially I-shaped, so in the region between the two flanges, above and below a connecting web 13, receiving pockets 14' are formed, accommodating planar slide bearing elements 12' for forming an air bearing 12 as well. Pressurised air having a pressure of approx. 2 to 6 bar is fed into the receiving pockets 11' and/or 14' via an air supply line not shown in more detail to allow substantially friction-free vibrating of the vibrating body 8 and the compensating mass 7.

In a centrally located clearance defined by the connecting element 2', pressurised air may be fed into and discharged from the clearances 11', 14' of the air bearings 12. In addition, a further actuator for causing vibrations in a vertical z direction might also be provided within this clearance, so that, by means of the device, not only any desired vibration such as a diagonal, a circular, a sinusoidal vibration or the like could be performed in the x and y directions by means of the piezo elements 10, 10' arranged substantially parallel to the cover plates 3, 4, but an additional vibration of the workpiece-receiving portion 2 in the z direction might also be obtained in a direction normal to this plane. The vibrating device 9 thus provides four degrees of freedom—taking into account the rotation around the z direction.

Figure 4:
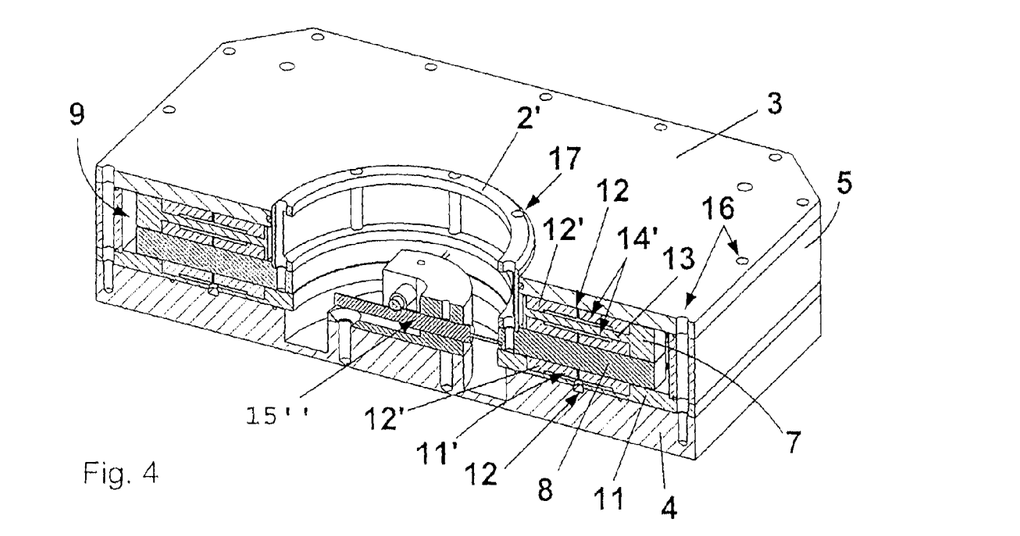
FIG. 4 shows a perspective sectional view of the device according to FIGS. 1 to 3.

As can further be seen in the section view of FIG. 4, the lower cover plate 4, the base plate 11, the housing 5 and the upper cover plate 3 are connected to one another by not illustrated screws which are screwed into the openings 16 provided for this purpose. In addition, the lower part 2' of the workpiece-receiving portion is connected to the vibrating body 8 and the workpiece-receiving portion 2 by screws (not illustrated) which are screwed into the receiving openings 17.

Figure 5:
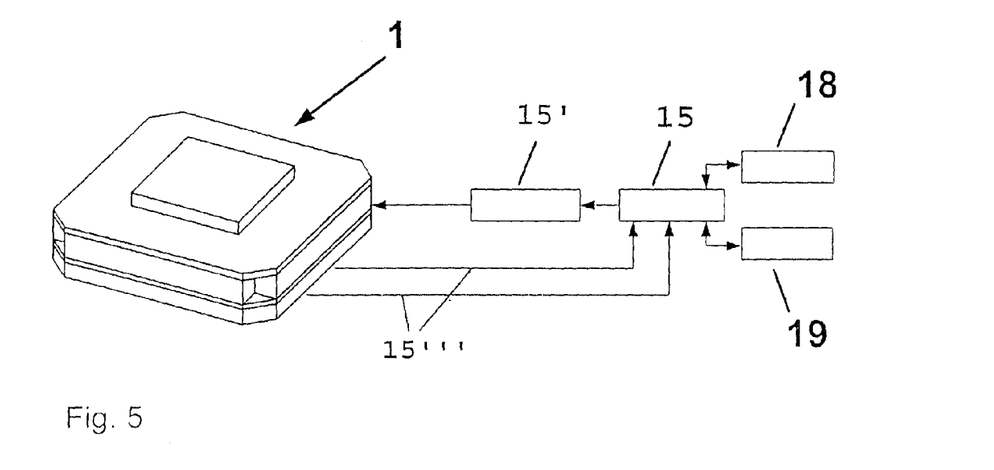
FIG. 5 shows a schematic view of a regulating circuit for regulating a momentum decoupling.

FIG. 5 shows mainly a control and/or regulating device 15 associated to the device 1 for actuating a generator 15' that supplies appropriate electrical pulses to the piezo elements 10, 10' so the vibrating device 9 is caused to vibrate at the desired frequency and with the desired amplitude. Out of the total of 16 piezo elements, which are composed of a total of 32 piezo stacks, groups of eight piezo stacks are always actuated in the same way (always four for either direction), i.e. the eight piezo stacks accommodated in the two piezo elements 10, 10' provided on a longitudinal side and in the piezo elements 10, 10' arranged on the opposite side.

The distance covered by the compensating mass 7 and the vibrating body 8 and their acceleration are then received by sensors such as a distance sensor 15" (cf. FIG. 4), and the measured distance and/or the measured acceleration are transmitted to the controller 15 via lines 15''' in order to close a regulating circuit and thus obtain an actively controlled momentum decoupling for reliably avoiding certain resonance vibrations. An operating unit 18 is connected to the control and/or regulating unit 15, allowing the operator to enter the desired frequency, amplitude, direction of vibration etc., and a numerical controller 19 (NC unit) of a machine tool 27 is also connected to the control and/or regulating unit 15.

Figure 6:
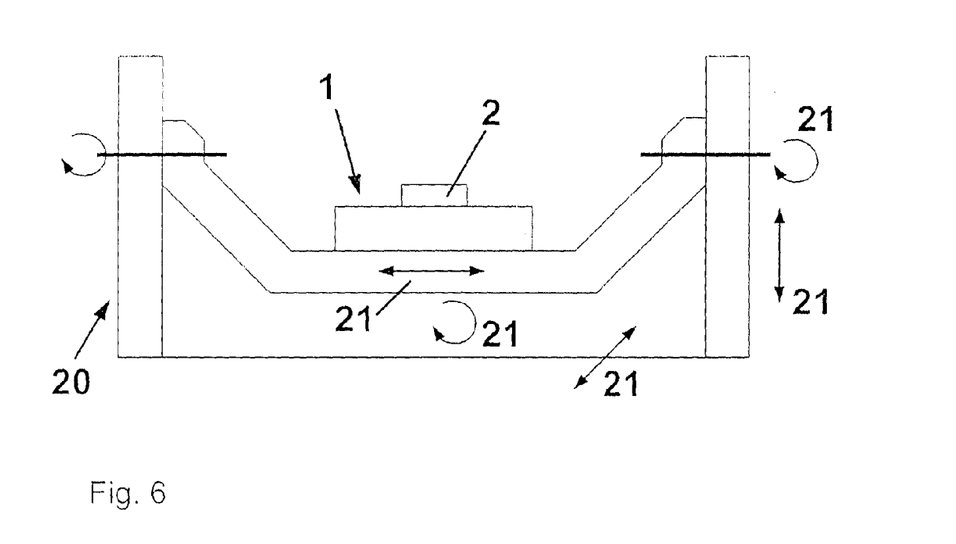
FIG. 6 shows a schematic view of a positioning device on which a device according to the invention is arranged.

FIG. 6 is a schematic illustration of a five-axes positioning device 20, on which the device 1 including the workpiece-receiving portion 2 is positioned. Due to the five axes 21 that allow adjusting the positioning device, a mechanical machining of complex 3D contours of the workpiece received on the workpiece-receiving portion 2 may be performed.

Figure 7:
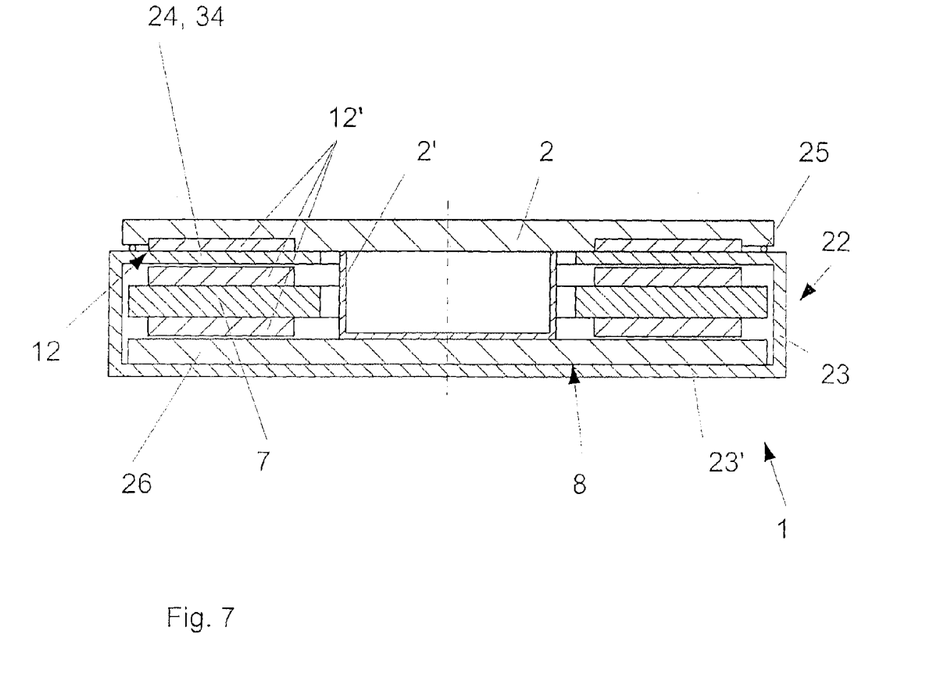
FIG. 7 shows a sectional view of an alternative set-up of the device according to the invention.

FIG. 7 shows an alternative exemplary embodiment of the device 1. A base body 22 is provided here, preferably comprising a housing 23 having a bottom surface 23' and onto which a cover plate 24 may be attached. The plate-shaped workpiece-receiving portion 2, also called the machine table, is supported on the cover plate 24 by means of an air bearing 12; for this, air bearing elements 12' are arranged between the cover plate 24 and the workpiece-receiving portion 2. In addition, a sealing element 25 is arranged between the workpiece-receiving portion 2 and the cover plate 24 in order to protect the air bearing 12 from the ingress of cooling greases and chips.

The compensating mass 7, which vibrates in the opposite direction to the vibrating body 8 for momentum decoupling, is accommodated in the base body 23; the vibrating body 8 has a base plate 26 connected to the plate-shaped workpiece-receiving portion, which is thus part of the vibrating body 8 as well, via a preferably cylindrical connecting element 2'. The vibrating body 8 as well as the compensating mass 7 are connected—as has already been described in detail in conjunction with the exemplary embodiment according to FIGS. 1 to 5—to the vibrating device 9; i. e. piezo elements 10, 10' vibrating in opposite directions engage the vibrating body 8 and the compensating mass 7.

Figure 8A:
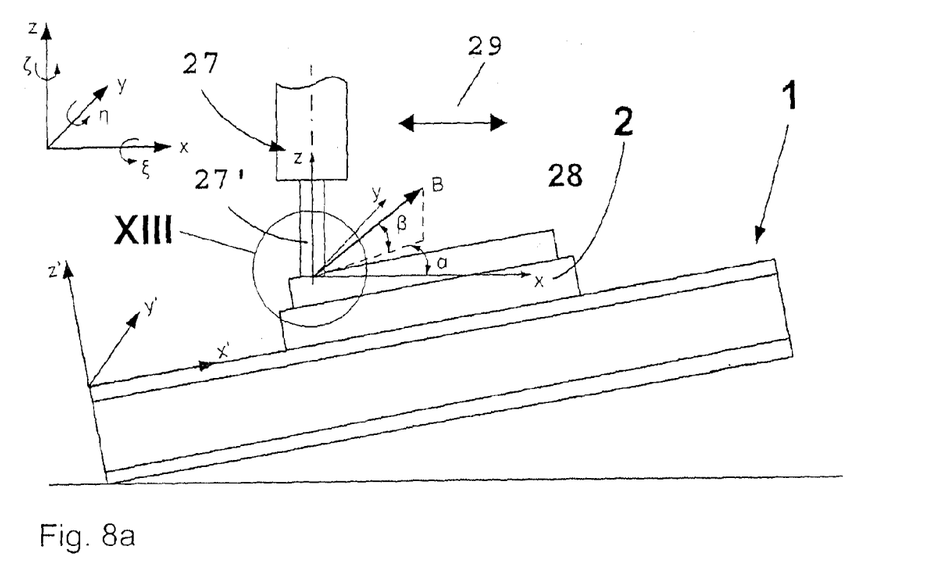
FIGS. 8a to 8d show schematic side views of a workpiece received on the device and being machined by a milling device.
Figure 8B:
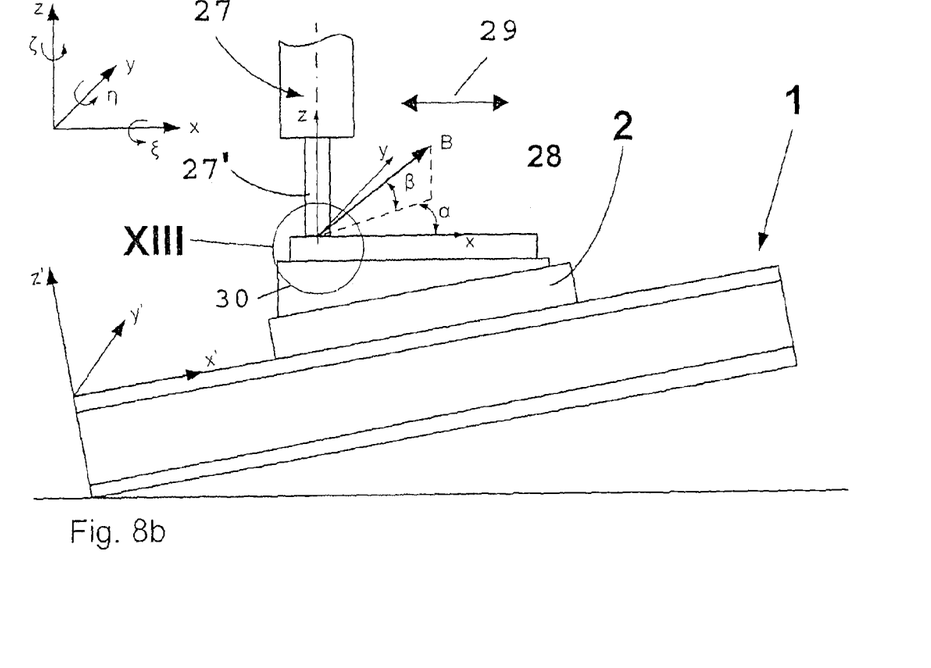
Figure 8C:
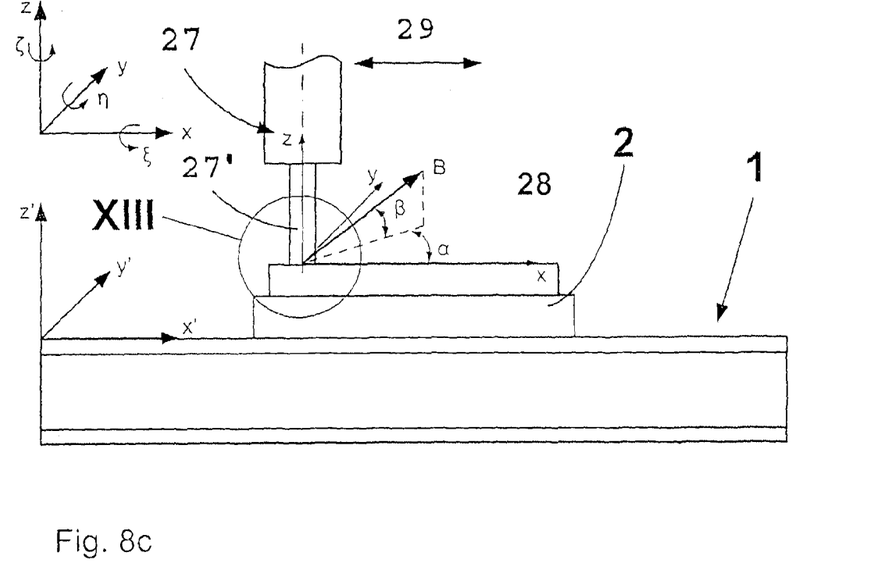
Figure 8D:
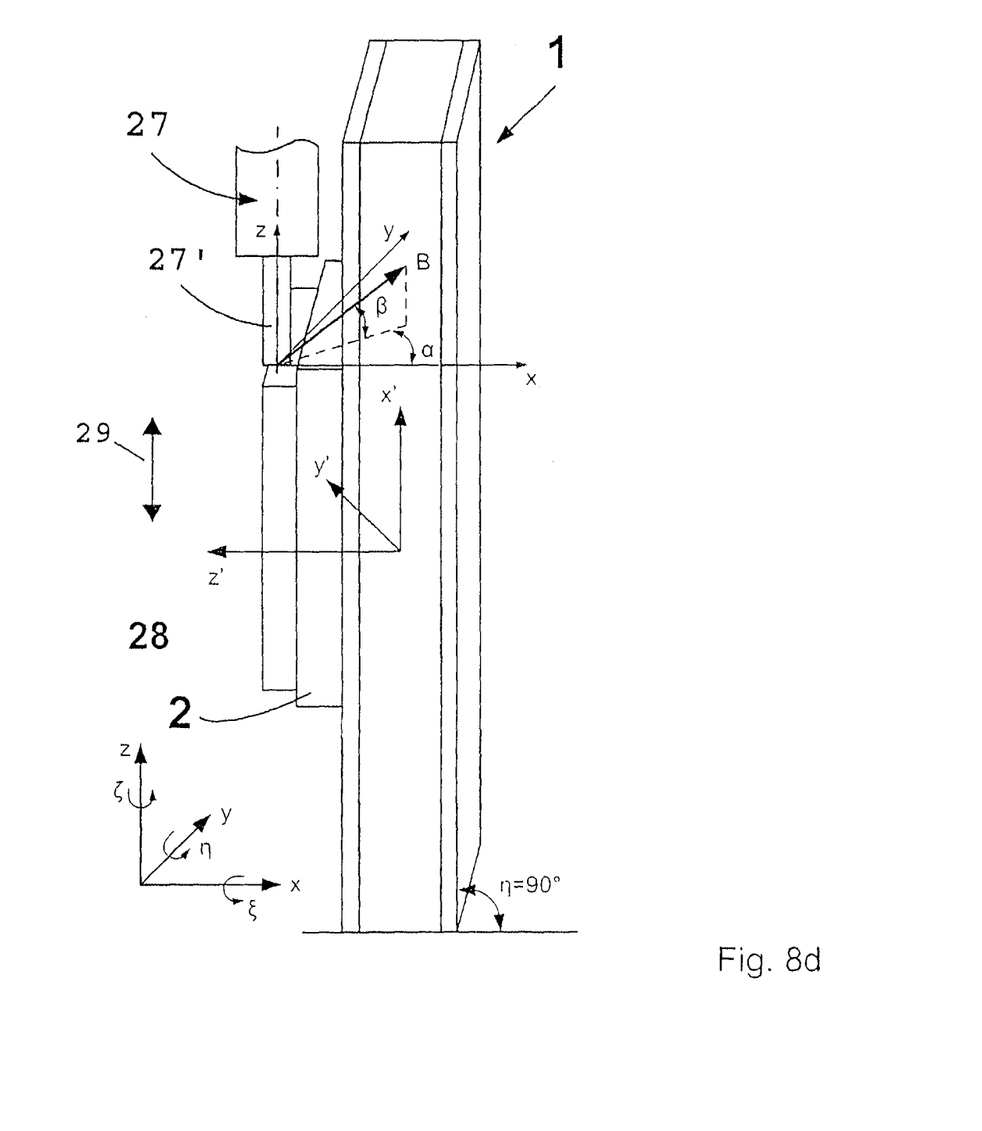

FIGS. 8a to 8d show different uses of the device 1, with the device being included in a base coordinate system (x, y, z). The vibrating device 9 itself has a relative coordinate system (x', y', z') in which the actuators vibrate. The device 1 may thus—as is shown in FIGS. 8a to 8d—be arranged in a tilted manner with respect to the base coordinate system in the angles ξ, η, ζ. The vibrating movement is then performed in the direction of the relative coordinate system whereas the tool 27' of the machine tool 27 may be moved in any desired direction 29 in the base coordinate system, preferably along any of the coordinate main axes. The orientation of the angles allows to orient the vibrating movement in any configuration with respect to the base coordinate system. As can be seen in FIG. 8b, a workpiece 28 fixed on the workpiece-receiving portion 2 may be positioned along the orientation of the base coordinate system again by means of angle devices 30.

Figure 9:
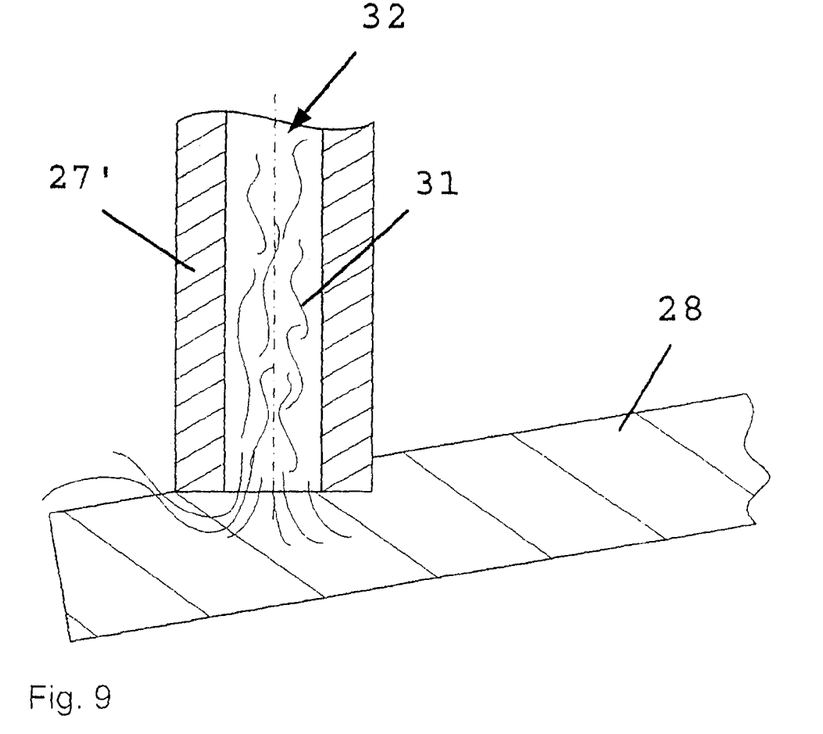

It has been found particularly advantageous to cause a cooling liquid 31 (cf. FIG. 9), which is fed into the region to be machined in order to cool the tool 27' of a machine tool such as a milling tool 27, to vibrate during the chip-removing machining of hard plates 28 made of hardened steel, ceramic materials or the like, for example. Due to the vibration of the cooling liquid 31, chips removed by the tool 27' are discharged considerably more effectively. For all this, the cooling liquid 31 is usually fed into the region to be machined via a cooling duct 32 formed within the tool 27'. Because of the improved flushing behaviour, this will result in possibilities for an improvement of cutting parameters in order to considerably shorten machining time and thus substantially reduce production costs.

The invention claimed is:

1. A device comprising:
    a workpiece-receiving portion for receiving a workpiece to be mechanically machined during use; and
    at least one vibrating device connected to the workpiece-receiving portion, the at least one vibrating device further defined as comprising a vibrating body associated with a compensating mass;
    wherein, during use, the vibrating device causes the workpiece-receiving portion to vibrate at a frequency that is lower than that of ultrasound and the vibrating body rotates in an opposite direction from the compensating mass.

2. The device of claim 1, wherein the frequency of the vibration of the workpiece-receiving portion is between 500 Hz and 50 Hz during use.

3. The device of claim 1, wherein the compensating mass vibrates at the same frequency as and with a higher amplitude than the vibrating body during use.

4. The device of claim 1, wherein the vibrating device comprises at least one piezo element.

5. The device of claim 4, comprising at least two piezo elements having directions of movement that move the vibrating body in a plane during use.

6. The device of claim 5, wherein the at least two piezo elements are arranged vertically.

7. The device of claim 4, wherein substantially a same type and number of piezo elements engage the compensating mass and the vibrating body.

8. The device of claim 4, further comprising a control and/or regulating device that controls and/or regulates opposite movements of the piezo elements associated to the vibrating body and the piezo elements associated to the compensating mass, during use.

9. The device of claim 8, further comprising distance and/or acceleration sensors are associated with the vibrating body and the compensating mass, wherein during use values of distance and/or acceleration are supplied to the control and/or regulating device as actual values.

10. The device of claim 1, further comprising at least one air bearing supporting the vibrating body and/or the compensating mass.

11. The device of claim 1, further comprising a plate-shaped workpiece-receiving portion that comprises a cover plate supported by a base body.

12. The device of claim 11, wherein the plate-shaped workpiece-receiving portion is supported on the cover plate of the base body by an air bearing.

13. The device of claim 11, further comprising a counter plate firmly connected to the plate-shaped workpiece-receiving portion, wherein the compensating mass is arranged between the plate-shaped workpiece-receiving portion and the counter plate.

14. The device of claim 1, wherein the device is comprised on a positioning device up to five axes of the positioning device are adjustable.

15. The device of claim 1, wherein at least one vibrating direction (x', y', z') of the vibrating device deviates from a direction of movement of a chip-removing tool during use.

16. The device of claim 15, wherein the chip-removing tool is further defined as milling tool.

17. The device of claim 1, further defined as a chip-removing machine that is cooled by a cooling liquid and/or a cooling grease during use.

18. The device of claim 17, further defined as a milling tool.

19. A method for mechanically machining a workpiece comprising:
    causing the workpiece to vibrate at a lower than ultrasound; and
    actively decoupling momentum introduced into the workpiece by the vibration.

20. The method of claim 19, wherein the frequency of the vibration of the workpiece is between 500 Hz and 50 Hz.

* * * * *